US00RE37624E

(19) United States
(12) Reissued Patent
Pappas et al.

(10) Patent Number: US RE37,624 E
(45) Date of Reissued Patent: Apr. 9, 2002

(54) PANTYHOSE GARMENT WITH SPARE LEG PORTION

(76) Inventors: Annette L. Pappas, 316 Oak Ave., Harahan, LA (US) 70123; Nita A. Vaccaro, 4517 Lake Louise, Metairie, LA (US) 70001

(21) Appl. No.: 09/498,253

(22) Filed: Feb. 3, 2000

Related U.S. Patent Documents

Reissue of:
(64) Patent No.: 5,713,081
Issued: Feb. 3, 1998
Appl. No.: 08/751,501
Filed: Nov. 18, 1996

(51) Int. Cl.[7] ..... A41B 11/00
(52) U.S. Cl. ..... 2/409; 2/239; 66/178 R
(58) Field of Search ..... 2/239, 61, 409, 2/240, 241, 242, 247, 250

(56) References Cited

U.S. PATENT DOCUMENTS

| | | | | | |
|---|---|---|---|---|---|
| 3,845,506 | A | * | 11/1974 | Harris | 2/224 |
| 4,019,208 | A | * | 4/1977 | Walse, Jr. et al. | 2/240 |
| 5,027,441 | A | * | 7/1991 | Wilson | 2/240 |
| 5,054,129 | A | * | 10/1991 | Baehr | 2/409 |
| 5,097,537 | A | * | 3/1992 | Ewing | 2/409 |

FOREIGN PATENT DOCUMENTS

| | | | | |
|---|---|---|---|---|
| DE | 2232675 | * | 1/1973 | 2/409 |

OTHER PUBLICATIONS

Partial translation of the German reference '675, Jan. 1973.*

* cited by examiner

*Primary Examiner*—John J. Calvert
*Assistant Examiner*—Alissa L. Hoey
(74) *Attorney, Agent, or Firm*—Kenneth L. Tolar

(57) ABSTRACT

A hosiery item including a panty member having three absorbent crotch members provided therein, each absorbent crotch member having a pocket formed therein; and three leg portions secured to the panty member in a manner such that an absorbent crotch member is positioned between any two leg portions, each leg portion having a leg insertion opening in connection with an interior of the panty member. In use the wearer inserts her legs into two of the leg opening in the conventional fashion of donning a pair of pantyhose. The remaining unused leg portion is then gathered and the toe end tucked into the pocket of one of the absorbent crotch members. If a run or hole develops in one of the leg portions being worn, the leg of the wearer can be easily and rapidly removed from the damaged leg portion and placed into the undamaged spare leg portion. The damaged leg portion is then gathered, folded and tucked into a pocket of one of the absorbent crotch members as wearer to select and use any two of the three leg portions for use.

8 Claims, 2 Drawing Sheets

PANTYHOSE GARMENT WITH SPARE LEG PORTION

Matter enclosed in heavy brackets [ ] appears in the original patent but forms no part of this reissue specification; matter printed in italics indicates the additions made by reissue.

TECHNICAL FIELD

The present invention relates to hosiery and more particularly to a pantyhose garment having three leg portions secured to a panty member having at least two absorbent crotch panels positioned between the points of attachment of the three leg portions. The use of three leg portions in combination with a panty member having at least two absorbent crotch panels allows the user to use two of the leg portions while retaining a spare leg portion for use when one of the other leg portions develops a run.

BACKGROUND OF THE INVENTION

Millions of women risk embarrassment daily by having to wear pantyhose that have developed runs and other damage to the leg portions thereof to important business and social engagements. Although many women carry a spare pair of pantyhose in a briefcase, purse or car, the spare pantyhose often do not match the outfit being worn. It would be a benefit, therefore, to have a pair of pantyhose that included a spare leg portion that could be quickly and easily switched with the damaged leg portion. It would be a further benefit, if the spare leg portion could be discreetly stored under the wearer's clothing when not needed.

SUMMARY OF THE INVENTION

It is thus an object of the invention to provide a pantyhose garment that includes a spare leg portion that can be quickly substituted for the damaged leg portion when required.

It is a further object of the invention to provide a pantyhose garment with a spare leg portion that can be discreetly hidden under the wearer's clothing when not needed.

It is a still further object of the invention to provide a pantyhose garment that includes three leg portions.

It is a still further object of the invention to provide a pantyhose garment having three leg portions that includes at least one pocket for inserting at least a portion of the unused leg portion.

It is a still further object of the invention to provide a pantyhose garment that accomplishes all or some of the above objects in combination.

Accordingly, a pantyhose garment is provided. The pantyhose garment comprises a panty member having three absorbent crotch members provided therein, each absorbent crotch member having a pocket formed therein; and three leg portions secured to the panty member in a manner such that an absorbent crotch member is positioned between any two leg portions, each leg portion having a leg insertion opening in connection with an interior of the panty member. In use the wearer inserts her legs into two of the leg openings in the conventional fashion of donning a pair of pantyhose. The remaining unused leg portion is then gathered and the toe end tucked into the pocket of one of the absorbent crotch members. If a run or hole develops in one of the leg portions being worn, the leg of the wearer can be easily and rapidly removed from the damaged leg portion and placed into the undamaged spare leg portion. The damaged leg portion is then gathered, folded and tucked into a pocket of one of the absorbent crotch members as previously described. Although only two crotch members are required, the use of three crotch members allows the wearer to select and use any two of the three leg portions for use.

BRIEF DESCRIPTION OF THE DRAWINGS

For a further understanding of the nature and objects of the present invention, reference should be had to the following detailed description, taken in conjunction with the accompanying drawings, in which like elements are given the same or analogous reference numbers and wherein.

DESCRIPTION OF THE EXEMPLARY EMBODIMENT

Figure 1:
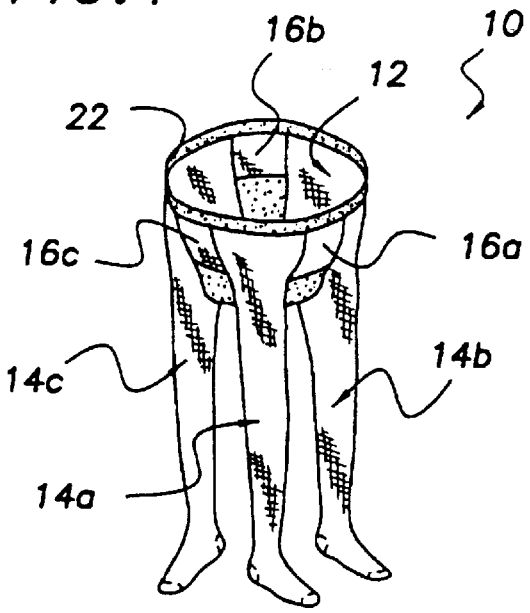
FIG. 1 is a perspective view of an exemplary embodiment of the pantyhose with spare leg portion of the present invention showing the three leg portions, the three absorbent crotch members with pocket, and the crotch members and leg portions attached together to form a panty portion.

FIG. 1 shows a first exemplary embodiment of the pantyhose with spare leg portion of the present invention generally designated by the numeral 10. Pantyhose 10 includes a panty member, generally designated by the numeral 12, and three leg portions, generally designated 14a,14b,14c extending from the bottom of panty member 12.

Figure 3:
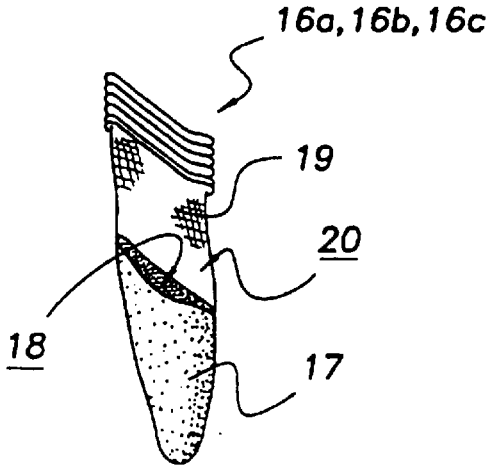
FIG. 3 is a perspective view of one of the three crotch members in isolation showing the absorbent portion, the crotch/panty portion, the crotch/waistband portion and the low profile pocket.

Panty member 12 includes three absorbent crotch members 16a,16b,16c. With reference to FIG. 3, each crotch member 16a,16b,16c includes an absorbent cotton portion 17 and a waist portion 19. Each absorbent cotton portion 17 includes a pocket 18 formed therein having an access opening 20 positioned exteriorly of panty member 12. Waist portion 19 is constructed from conventional nylon pantyhose material. Referring back to FIG. 1, panty member 12 is also provided with an elasticized waistband 22.

Figure 4:
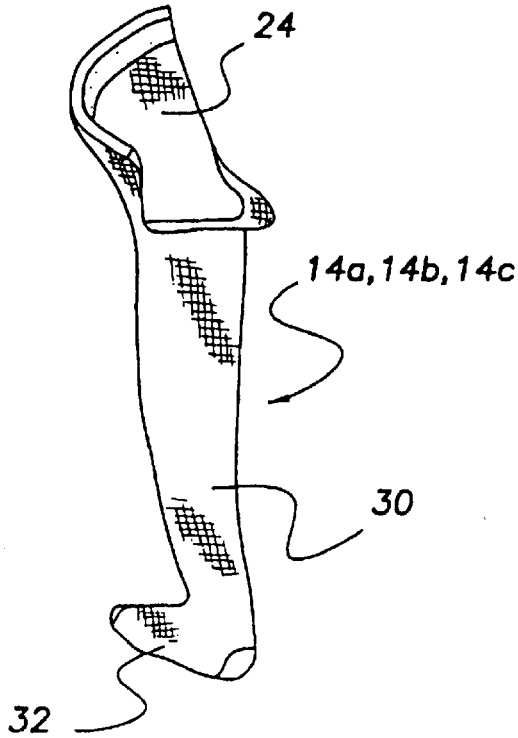
FIG. 4 is a perspective view of one of the leg portions in isolation showing the leg/panty portion and the stocking portion.
Figure 5:
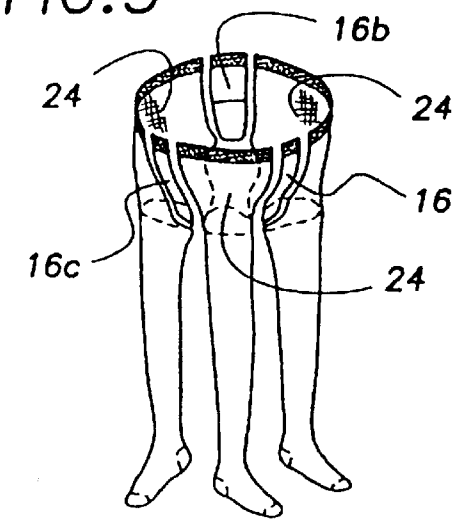
FIG. 5 is a perspective, exploded view of the pantyhose of FIG. 1 with the three leg portions exploded away from the three crotch members.

Referring now to FIG. 4, the remainder of panty member 12 is formed by panty waist sections 24 formed at the top of each leg portion 14a,14b,14c. With reference to FIG. 5, panty waist sections 24 are stitched to crotch members 16a,16b,16c to form the completed panty member 12.

Figure 2:
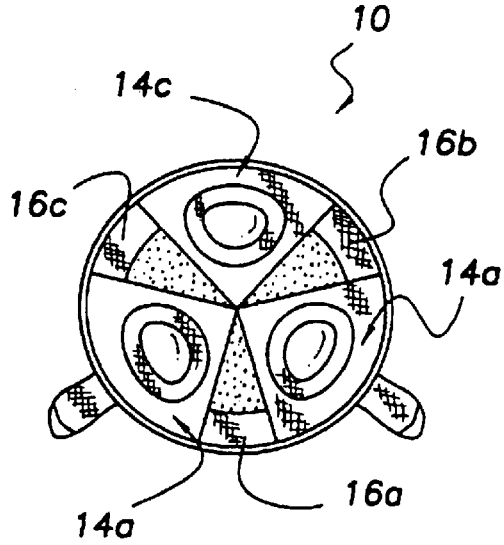
FIG. 2 is a top view of the pantyhose of FIG. 1 showing interconnection of the three crotch members and the three leg portions.
Figure 6B:
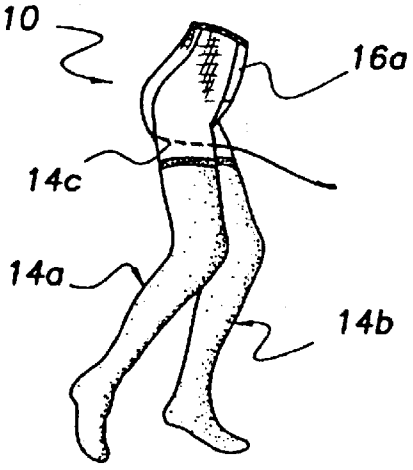
FIG. 6B is a side view showing the pantyhose of FIG. 1 in use with one of the leg portions unused and positioned between the two in use leg portions prior to positioning the unused leg portion into the pocket of one of the crotch members.
Figure 6A:
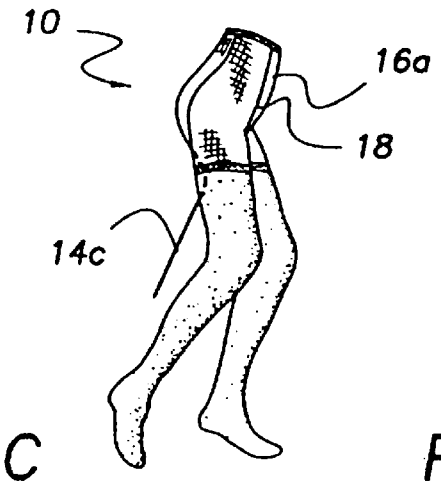
FIG. 6A is a side view showing the pantyhose of FIG. 1 in use with one of the leg portions unused and trailing behind the user prior to positioning the unused leg portion into the pocket of one of the crotch members.
Figure 6D:
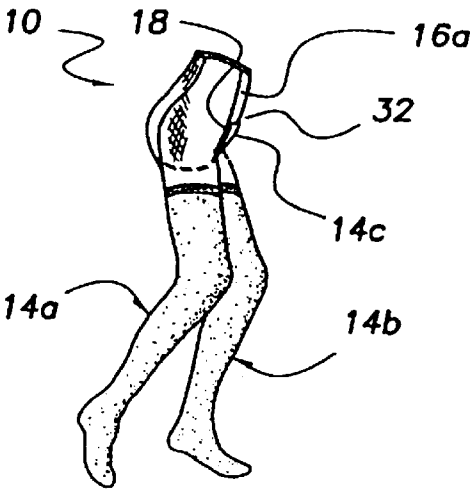
FIG. 6D is a side view showing the pantyhose of FIG. 1 in use with one of the leg portions unused and positioned between the two in use leg portions and with the toe end partially folded and inserted into the pocket of one of the crotch members.
Figure 6C:
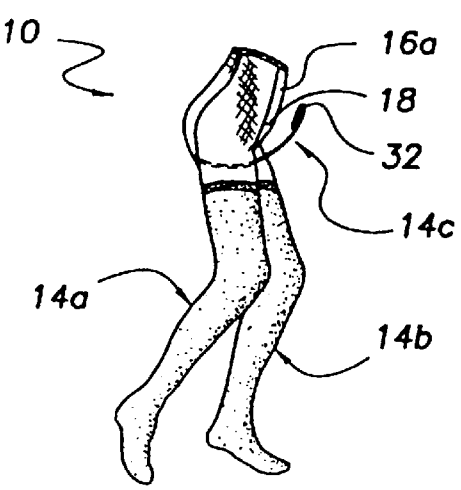
FIG. 6C is a side view showing the pantyhose of FIG. 1 in use with one of the leg portions unused and positioned between the two in use leg portions and with the toe end partially folded for insertion into the pocket of one of the crotch members.

Now with reference to FIG. 4, each leg portion 14a,14b, 14c is constructed from conventional knitted nylon hosiery material. However, any type material used in constructing pantyhose, such as silk, etc. can be used to construct the leg portions and the panty member of the present invention. Each leg portion 14a,14b,14c includes a legging section 30 for covering the thigh and calf of the wearer and a foot section 32 for covering the ankle and foot of the wearer. FIG. 2 shows the pantyhose garment 10 of FIG. 1 from the top showing waistband 22, crotch members 16a,16b,16c, and leg portions 14a,14b,14c stitched together to form the completed pantyhose garment 10. FIGS. 6a–6d illustrate use of pantyhose garment 10 of FIG. 1. FIG. 6A shows pantyhose 10 in use with leg portion 14c unused and trailing behind the user prior to positioning leg portion 14c into pocket 18 of crotch member 16a. FIG. 6B shows leg portion 14c positioned between leg portions 14a,14b prior to tucking toe section 32 of leg portion 14c into pocket 18 of crotch member 16a. FIG. 6C shows pantyhose 10 of FIG. 1 in use with leg portion 14c gathered, positioned between leg portions 14a,14b and foot 32 partially folded prior to tucking into the pocket 18 of crotch member 16a. FIG. 6D shows pantyhose 10 of FIG. 1 in use with leg portion 14c gathered, positioned between leg portions 14a,14b foot 32 folded and tucked into pocket 18 of crotch member 16a. It can be seen that the user can insert her legs into any two leg portions 14a,14b,14c and fold and tuck the remaining leg portion 14a,14b,14c into a pocket 18 of a crotch member 16a,16b, 16c. When one of the leg portions 14a,14b,14c becomes damaged, it is a simple process for the user to switch to the two remaining undamaged leg portions 14a,14b,14c.

It can be seen from the preceding description that a pantyhose garment has been provided that includes a spare leg portion that can be quickly substituted for the damaged leg portion when required; that includes a spare leg portion that can be discreetly hidden under the wearer's clothing when not needed; that includes three leg portions; and that includes at least one pocket for inserting at least a portion of the unused leg portion.

It is noted that the embodiment of the pantyhose garment with spare leg portion described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A pantyhose garment with spare leg portion comprising:

a panty member having three absorbent crotch members, each absorbent crotch member having a pocket formed therein; and three leg portions secured to said panty member in a manner such that an absorbent crotch member is positioned between any two leg portions, each leg portion having a leg insertion opening in connection with an interior of said panty member.

2. The pantyhose garment with spare leg portion of claim 1, wherein:

each absorbent crotch member includes an absorbent portion and a waist portion, each absorbent portion including said pocket formed therein, said pocket being accessible through an access opening positioned exteriorly of said panty member.

3. The pantyhose garment with spare leg portion of claim 1, wherein:

said panty member includes an elasticized waistband.

4. The pantyhose garment with spare leg portion of claim 1 wherein:

said panty member is constructed by stitching panty waist sections formed at a top of each leg portion to said absorbent crotch members in a manner such that each of said absorbent crotch members is positioned between two of said panty waist sections.

5. The pantyhose garment with spare leg portion of claim 2 wherein:

said panty member is constructed by stitching panty waist sections formed at a top of each leg portion to said absorbent crotch members in a manner such that each of said absorbent crotch members is positioned between two of said panty waist sections.

6. The pantyhose garment with spare leg portion of claim 2, wherein:

said panty member includes an elasticized waistband.

7. The pantyhose garment with spare leg portion of claim 6 wherein:

said panty member is constructed by stitching panty waist section formed at a top of each leg portion to said absorbent crotch members in a manner such that each of said absorbent crotch members is positioned between two of said panty waist sections.

8. A pantyhose garment with spare leg portion comprising:

a panty member [having at least two crotch members provided therein, and at least two pockets formed in connection therewith]; [and]

three leg portions secured to said panty member, each leg portion having a leg insertion opening in connection with an interior of said panty member[.];

*at least one pocket on said panty member for receiving any one of said leg portions.*

* * * * *